(12) United States Patent  
Yamanaka

(10) Patent No.: US 9,136,774 B2  
(45) Date of Patent: Sep. 15, 2015

(54) POWER CONVERTING APPARATUS

(71) Applicant: KABUSHIKI KAISHA YASKAWA DENKI, Kitakyushu-shi (JP)

(72) Inventor: Katsutoshi Yamanaka, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 207 days.

(21) Appl. No.: 13/776,709

(22) Filed: Feb. 26, 2013

(65) Prior Publication Data

US 2013/0229835 A1      Sep. 5, 2013

(30) Foreign Application Priority Data

Mar. 2, 2012   (JP) ................................ 2012-047398

(51) Int. Cl.
| | | |
|---|---|---|
| H02M 5/458 | (2006.01) | |
| H02M 5/297 | (2006.01) | |
| H02M 1/12 | (2006.01) | |
| H02M 1/00 | (2007.01) | |
| H02M 7/5387 | (2007.01) | |

(52) U.S. Cl.
CPC ............ *H02M 5/4585* (2013.01); *H02M 5/297* (2013.01); *H02M 1/12* (2013.01); *H02M 5/458* (2013.01); *H02M 2001/0012* (2013.01); *H02M 2007/53876* (2013.01)

(58) Field of Classification Search
CPC .............. H02M 5/4585; H02M 5/458; H02M 2001/0012

USPC ............ 363/37, 89, 125, 126, 127, 65, 68, 72  
See application file for complete search history.

(56) References Cited

U.S. PATENT DOCUMENTS

2006/0133120 A1 * 6/2006 Sato et al. ....................... 363/37  
2009/0059633 A1   3/2009 Hara et al.

FOREIGN PATENT DOCUMENTS

| CN | 101160708 | 4/2008 |
|---|---|---|
| JP | 2009-171696 | 7/2009 |
| WO | WO 2006/112275 | 10/2006 |

OTHER PUBLICATIONS

Chinese Office Action for corresponding CN Application No. 201310064191.3, Nov. 25, 2014.

\* cited by examiner

*Primary Examiner* — Matthew Nguyen  
*Assistant Examiner* — Trinh Dang  
(74) *Attorney, Agent, or Firm* — Mori & Ward, LLP

(57) ABSTRACT

A power converting apparatus according to an embodiment includes a controller that controls a power converter. The controller includes a first signal generator which generates switch drive signals for AC-to-DC conversion, a second signal generator which generates switch drive signals for DC-to-AC conversion, and a drive signal generator which generates, in accordance with the switch drive signals for AC-to-DC conversion and the switch drive signals for DC-to-AC conversion, switch drive signals for controlling the power converter. The first signal generator and the second signal generator operate in synchronization with each other.

18 Claims, 12 Drawing Sheets

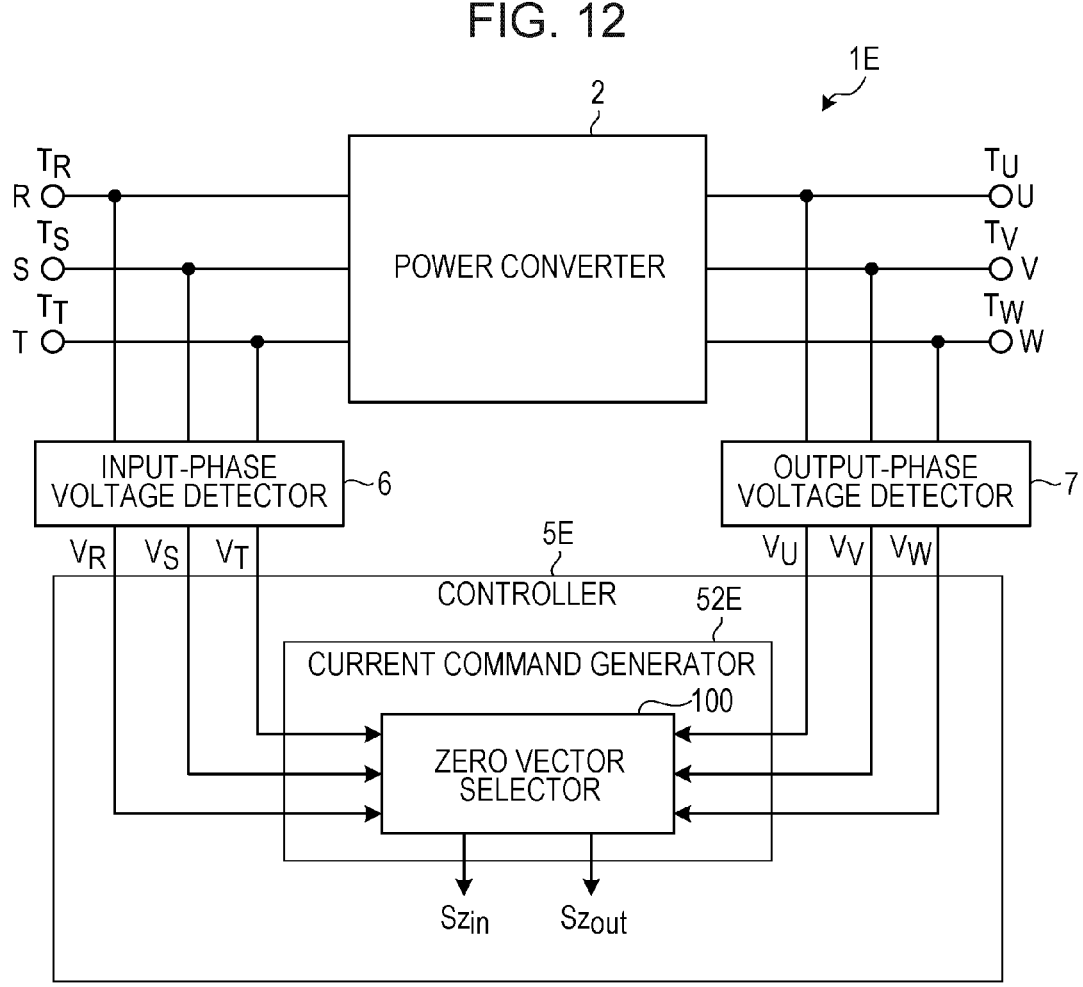

$Vrt+Vuw=(Vr-Vt)+(Vu-Vw)$ $Vrt-Vuw=(Vr-Vt)-(Vu-Vw)$

POWER CONVERTING APPARATUS

CROSS-REFERENCE TO RELATED APPLICATIONS

The present disclosure contains subject matter related to that disclosed in Japanese Priority Patent Application JP 2012-047398 filed in the Japan Patent Office on Mar. 2, 2012, the entire contents of which are hereby incorporated by reference.

BACKGROUND OF THE INVENTION

1. Field of the Invention

The embodiments of the present disclosure relate to a power converting apparatus.

2. Description of the Related Art

A matrix converter including a plurality of bidirectional switches which connect individual input phases and individual output phases is available as a power converting apparatus. Regarding the matrix converter, a technology for realizing a step-up function has been suggested (for example, see International Publication No. 2006/112275).

In the matrix converter having a step-up function, reactors are provided between individual input phases and bidirectional switches, the input-phase side of the reactors is short-circuited and then released by the bidirectional switches to output a voltage higher than a power supply voltage.

SUMMARY OF THE INVENTION

A power converting apparatus according to an aspect of the embodiments includes a power converter and a controller. The power converter includes a plurality of unidirectional switches which connect input phases and output phases, and includes a plurality of switch groups each being provided for one of the input phases, and a plurality of inductors coupled to one another, each of the inductors being connected between one of the input phases and a corresponding one of the switch groups. The controller includes a first signal generator which generates switch drive signals for AC-to-DC conversion, a second signal generator which generates switch drive signals for DC-to-AC conversion, and a drive signal generator which generates, in accordance with the switch drive signals for AC-to-DC conversion and the switch drive signals for DC-to-AC conversion, switch drive signals for controlling on and off of the plurality of unidirectional switches. The first signal generator and the second signal generator operate in synchronization with each other.

BRIEF DESCRIPTION OF THE DRAWINGS

FIG. 12 is a diagram illustrating an example configuration of a power converting apparatus according to a sixth embodiment;

DESCRIPTION OF THE EMBODIMENTS

Hereinafter, embodiments of a power converting apparatus disclosed by the present application will be described in detail with reference to the attached drawings. The present disclosure is not limited by the following embodiments.

First Embodiment

Figure 1:
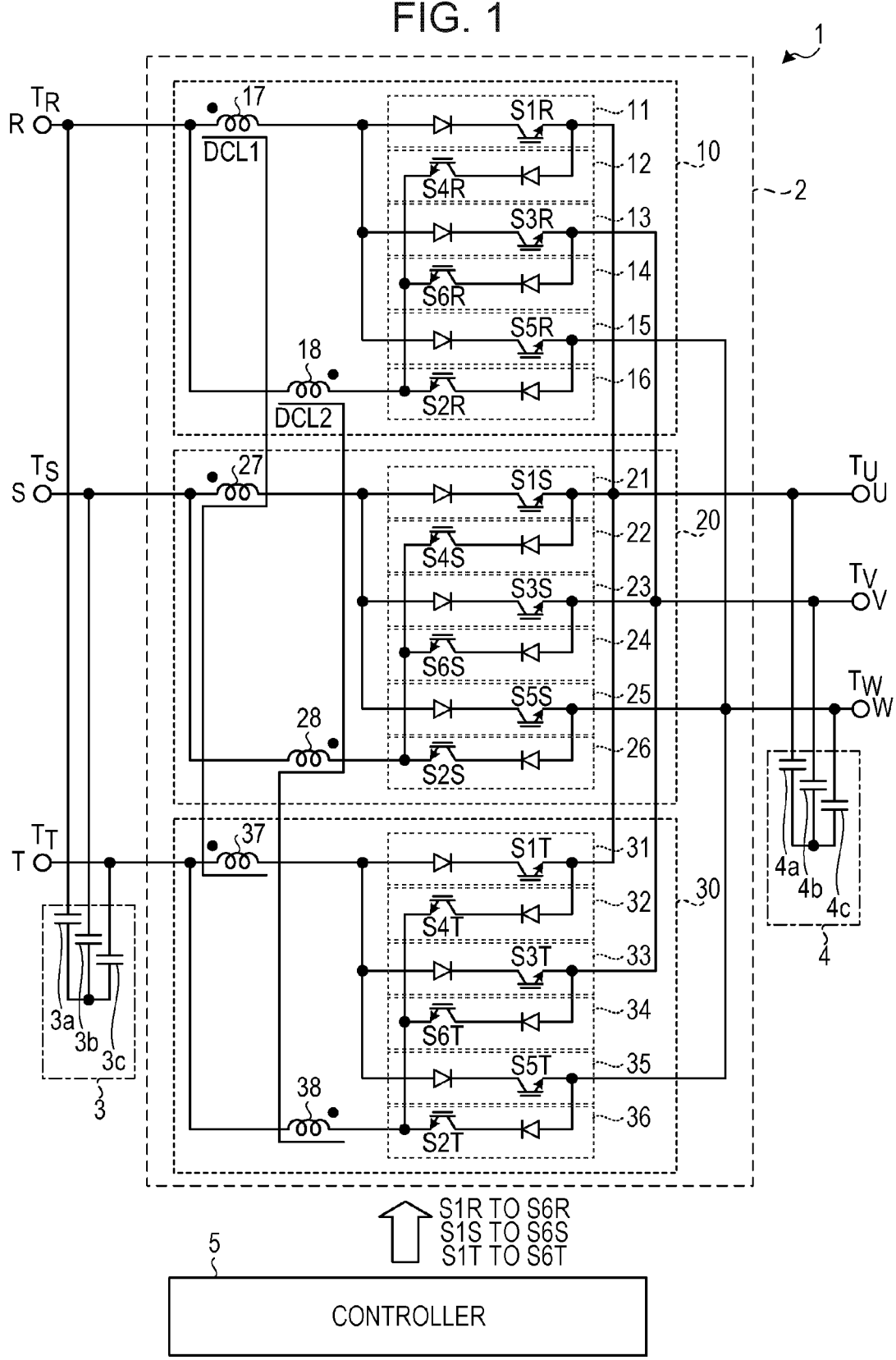
FIG. 1 is a diagram illustrating an example configuration of a power converting apparatus according to a first embodiment.

First, a power converting apparatus according to a first embodiment will be described. FIG. 1 is a diagram illustrating an example configuration of the power converting apparatus according to the first embodiment.

As illustrated in FIG. 1, a power converting apparatus 1 according to the first embodiment is a current-source power converting apparatus, and includes a power converter 2, a first filter 3, a second filter 4, and a controller 5. The power converting apparatus 1 is capable of performing bidirectional power conversion between three input phases of R-phase, S-phase, and T-phase and three output phases of U-phase, V-phase, and W-phase, and is also capable of increasing and decreasing voltage.

The power converter 2 includes an R-phase input terminal $T_R$, an S-phase input terminal $T_S$, and a T-phase input terminal $T_T$ connected to R-phase, S-phase, and T-phase as input phases, respectively, and a U-phase output terminal $T_U$, a V-phase output terminal $T_V$, and a W-phase output terminal $T_W$ connected to U-phase, V-phase, and W-phase as output phases, respectively. The R-phase input terminal $T_R$, the S-phase input terminal $T_S$, and the T-phase input terminal $T_T$ are connected to, for example, respective phases of a three-phase alternating current (AC) power supply. The U-phase output terminal $T_U$, the V-phase output terminal $T_V$, and the W-phase output terminal $T_W$ are connected to, for example, respective phases of an electric motor.

Also, the power converter 2 includes a first switching section 10, a second switching section 20, and a third switching section 30 which are provided between the input terminals $T_R$, $T_S$, and $T_T$ and the output terminals $T_U$, $T_V$, and $T_W$. Each of the switching sections 10, 20, and 30 constitutes a current-source inverter circuit.

Each of the switching sections 10, 20, and 30 includes six unidirectional switches and two direct current (DC) inductors. Each of the unidirectional switches includes a diode and a switching element. As the switching element, an insulated gate bipolar transistor (IGBT), a metal-oxide-semiconductor field-effect transistor (MOSFET), or the like is used, for example. Instead of the diode and the switching element including an IGBT, a reverse-blocking IGBT may be used.

The DC inductors are magnetically coupled to one another among the three switching sections 10, 20, and 30. Specifically, DC inductors 17, 27, and 37 are magnetically coupled to one another, and actually function as a single inductor element DCL1. Also, DC inductors 18, 28, and 38 are magnetically coupled to one another, and actually function as a single inductor element DCL2.

In the example illustrated in FIG. 1, the polarity of induced current of the DC inductors 17, 18, 27, 28, 37, and 38 are represented by black circles. The numbers of turns of individual windings in the DC inductors 17, 27, and 37 coupled to one another are equal, and the numbers of turns of individual windings in the DC inductors 18, 28, and 38 coupled to one another are equal. Thus, among the windings of the DC inductors coupled to one another, a current flowing in one winding can be moved to another winding with the magnitude thereof being maintained.

The first switching section 10 is provided between the input terminal $T_R$ and the output terminals $T_U$, $T_V$, and $T_W$. The first switching section 10 includes a switch group composed of six unidirectional switches 11 to 16, and two DC inductors 17 and 18. The unidirectional switches 11 to 16 are driven by switch drive signals S1R, S4R, S3R, S6R, S5R, and S2R, respectively.

A current path from the input terminal $T_R$ to the output terminals $T_U$, $T_V$, and $T_W$ is formed of three unidirectional switches 11, 13, and 15 and the DC inductor 17. On the other hand, a current path from the output terminals $T_U$, $T_V$, and $T_W$ to the input terminal $T_R$ is formed of three unidirectional switches 12, 14, and 16 and the DC inductor 18.

The second switching section 20 and the third switching section 30 have a configuration similar to that of the first switching section 10, but the input terminal connected thereto is different. Specifically, the second switching section 20 is provided between the input terminal $T_S$ and the output terminals $T_U$, $T_V$, and $T_W$. The second switching section 20 includes a switch group composed of six unidirectional switches 21 to 26, and two DC inductors 27 and 28. The unidirectional switches 21 to 26 are driven by switch drive signals S1S, S4S, S3S, S6S, S5S, and S2S, respectively.

A current path from the input terminal $T_S$ to the output terminals $T_U$, $T_V$, and $T_W$ is formed of three unidirectional switches 21, 23, and 25 and the DC inductor 27. On the other hand, a current path from the output terminals $T_U$, $T_V$, and $T_W$ to the input terminal $T_S$ is formed of three unidirectional switches 22, 24, and 26 and the DC inductor 28.

The third switching section 30 is provided between the input terminal $T_T$ and the output terminals $T_U$, $T_V$, and $T_W$. The third switching section 30 includes a switch group composed of six unidirectional switches 31 to 36, and two DC inductors 37 and 38. The unidirectional switches 31 to 36 are driven by switch drive signals S1T, S4T, S3T, S6T, S5T, and S2T, respectively.

A current path from the input terminal $T_T$ to the output terminals $T_U$, $T_V$, and $T_W$ is formed of three unidirectional switches 31, 33, and 35 and the DC inductor 37. On the other hand, a current path from the output terminals $T_U$, $T_V$, and $T_W$ to the input terminal $T_T$ is formed of three unidirectional switches 32, 34, and 36 and the DC inductor 38.

As described above, the power converter 2 includes the plurality of unidirectional switches 11 to 16, 21 to 26, and 31 to 36 between the individual input terminals and the individual output terminals, and these switches are controlled by the switch drive signals S1R to S6R, S1S to S6S, and S1T to S6T. The unidirectional switches 11, 13, 15, 21, 23, 25, 31, 33, and 35 correspond to an example of first unidirectional switches, and the unidirectional switches 12, 14, 16, 22, 24, 26, 32, 34, and 36 correspond to an example of second unidirectional switches.

The first filter 3 includes three capacitors 3a to 3c, and functions as an input-side filter. One ends of the capacitors 3a to 3c are connected to the input terminals $T_R$, $T_S$, and $T_T$, respectively, and the other ends are connected in common.

The second filter 4 includes three capacitors 4a to 4c, and functions as an output-side filter. One ends of the capacitors 4a to 4c are connected to the output terminals $T_U$, $T_V$, and $T_W$, respectively, and the other ends are connected in common.

The controller 5 generates the above-described switch drive signals S1R to S6R, S1S to S6S, and S1T to S6T, and outputs them to the power converter 2. The power converter 2 performs bidirectional power conversion between the individual input terminals $T_R$, $T_S$, and $T_T$ and the individual output terminals $T_U$, $T_V$, and $T_W$ on the basis of the switch drive signals S1R to S6R, S1S to S6S, and S1T to S6T received from the controller 5.

The controller 5 generates the switch drive signals S1R to S6R, S1S to S6S, and S1T to S6T serving as pulse signals, so that current constantly flows through any one of the DC inductors 17, 27, and 37 and any one of the DC inductors 18, 28, and 38.

Accordingly, the power converting apparatus 1 causes a direct current flowing in a current-source power converting apparatus in the related art to be pulsed, and causes a current equivalent to that in the current-source power converting apparatus in the related art to flow, thereby being able to perform an operation equivalent to that of the current-source power converting apparatus in the related art. Furthermore, the power converting apparatus 1 is capable of stepping up and down voltage during power conversion without being externally provided with a reactor and a switch.

Figure 2:
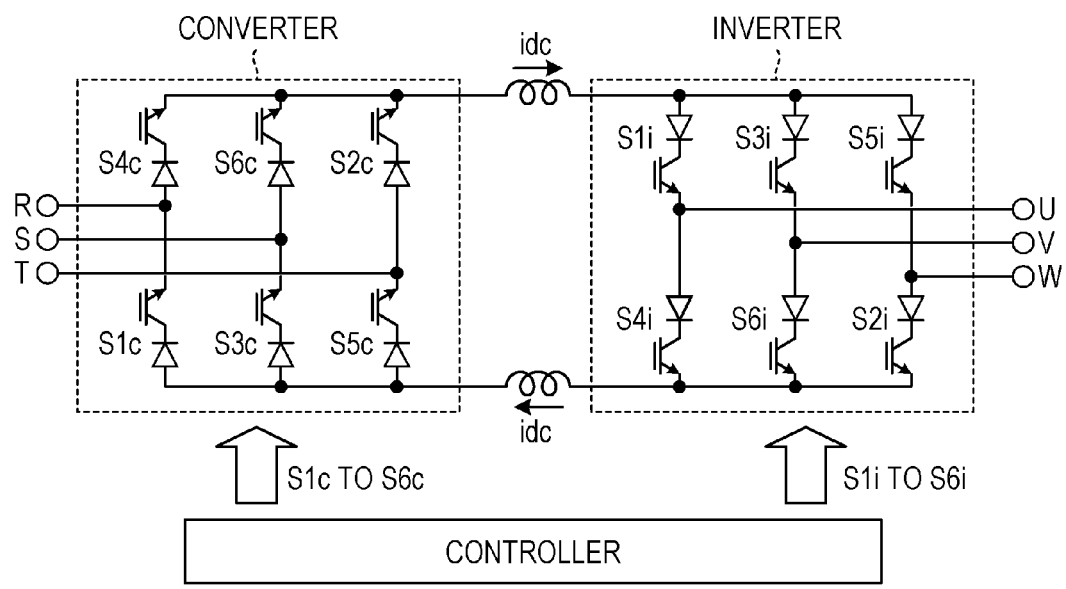
FIG. 2 is a diagram illustrating the configuration of a three-phase input and three-phase output current-source inverter.

FIG. 2 is a diagram illustrating a configuration of a three-phase input and three-phase output current-source inverter. The current-source inverter generates a direct current idc from an alternating current with a converter, and then converts the direct current idc to an alternating current with an inverter.

As illustrated in FIG. 1, the power converter 2 includes the plurality of unidirectional switches between the individual input terminals $T_R$, $T_S$, and $T_T$ and the individual output terminals $T_U$, $T_V$, and $T_W$. The control of the power converter 2 is able to be explained by considering separately the control of the above-described converter and the control of the above-described inverter. That is, the control of the power converter 2 includes the control on the current-source converter side and the control on the current-source inverter side.

The controller 5 generates switch drive signals S1c to S6c for AC-to-DC conversion and switch drive signals S1i to S6i for DC-to-AC conversion. The switch drive signals S1c to S6c for AC-to-DC conversion are switch drive signals on the current-source converter side, and the switch drive signals S1i to S6i for DC-to-AC conversion are switch drive signals on the current-source inverter side.

The controller 5 combines the switch drive signals S1c to S6c for AC-to-DC conversion and the switch drive signals S1i to S6i for DC-to-AC conversion, thereby generating the switch drive signals S1R to S6R, S1S to S6S, and S1T to S6T for controlling the power converter 2.

Figure 3:
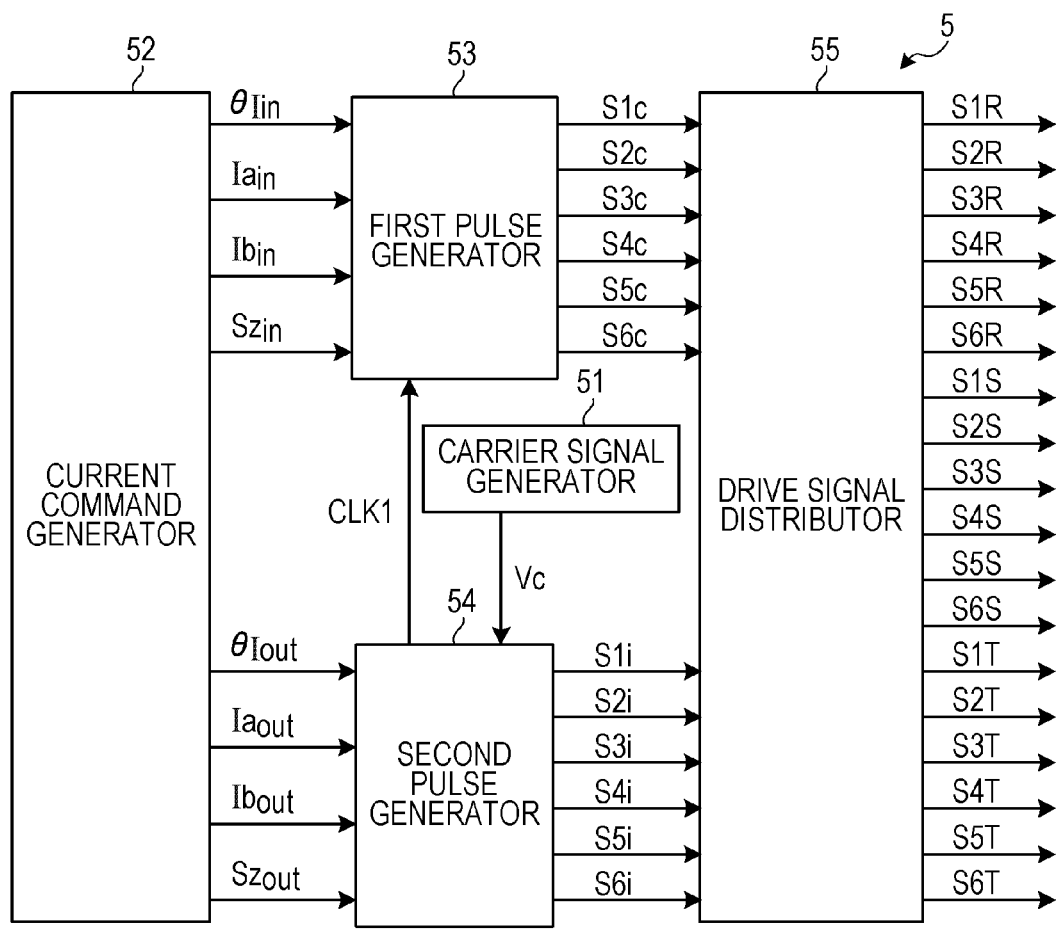
FIG. 3 is a diagram illustrating an example configuration of a controller according to the first embodiment.

Hereinafter, the configuration of the controller 5 will be described in detail. FIG. 3 is a diagram illustrating an example configuration of the controller 5. Here, as an example, description will be given of the case of performing AC-to-AC conversion on AC power input from the input terminals $T_R$, $T_S$, and $T_T$ and outputting the AC power to the output terminals $T_U$, $T_V$, and $T_W$. The same control can be applied to the opposite power flow.

As illustrated in FIG. 3, the controller 5 includes a carrier signal generator 51, a current command generator 52, a first pulse generator 53, a second pulse generator 54, and a drive signal distributor 55. The carrier signal generator 51 generates a carrier signal Vc and outputs it to the second pulse generator 54. The first pulse generator 53 is an example of a first signal generator, and the second pulse generator 54 is an example of a second signal generator. The drive signal distributor 55 is an example of a drive signal generator.

The current command generator 52 generates a control signal for AC-to-DC conversion (hereinafter referred to as a converter control signal) and outputs it to the first pulse generator 53. Also, the current command generator 52 generates a control signal for DC-to-AC conversion (hereinafter referred to as an inverter control signal) and outputs it to the second pulse generator 54.

First, the inverter control signal will be described. The current command generator 52 generates, as the inverter control signal, current vectors $Ia_{out}$ and $Ib_{out}$ constituting an output current command vector, a current phase command $\theta_{Iout}$, and a zero vector command $Sz_{out}$, and outputs them to the second pulse generator 54.

Figure 4:
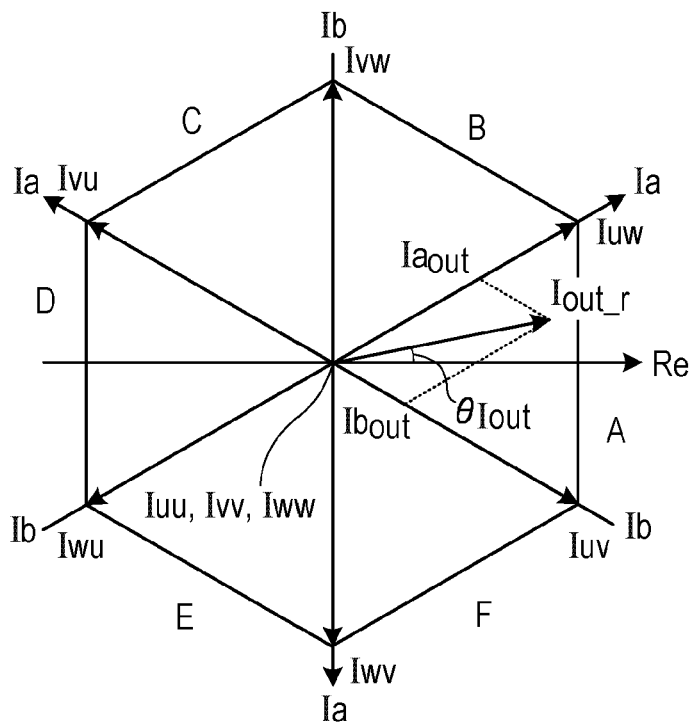
FIG. 4 is a spatial vector diagram of an output side of the power converting apparatus according to the first embodiment.

On the basis of the inverter control signal, the second pulse generator 54 generates and outputs switch drive signals S1$i$ to S6$i$ which are based on nine current vectors Iuv, Iuw, Ivw, Ivu, Iwu, Iwv, Iuu, Ivv, and Iww illustrated in FIG. 4.

Among the nine current vectors, the current vectors Iuv, Iuw, Ivw, Ivu, Iwu, and Iwv are current vectors corresponding to currents between different output phases (hereinafter refereed to as effective vectors). For example, the effective vector Iuv is a current vector corresponding to a current between U-phase and V-phase. As illustrated in FIG. 4, the effective vectors are classified into any one of two types: Ia vector and Ib vector.

Among the nine current vectors, the current vectors Iuu, Ivv, and Iww are current vectors corresponding to an identical output phase, and are current vectors having a zero magnitude (hereinafter referred to as zero vectors). For example, the zero vector Iuu is a current vector of zero magnitude corresponding to U-phase.

The second pulse generator 54 generates the switch drive signals S1$i$ to S6$i$ by using one zero vector adjacent to the output current command vector and two non-zero effective vectors $Ia_{out}$ and $Ib_{out}$.

The output current command vector is, for example, when a current of an output phase has a sinusoidal wave, a vector which rotates in the vector space illustrated in FIG. 4 at an angular velocity determined by a current frequency of the output phase. An inverter modulation factor $I_{out\_r}$ described below expresses a magnitude of the output current command vector which takes the value of one when the magnitude of the output current command vector matches the radius of an inscribed circle of the hexagon illustrated in FIG. 4.

The output durations of the current vectors used for generating the switch drive signals S1$i$ to S6$i$ in the second pulse generator 54 are defined as expressed by the following equations (1) to (3), in accordance with the inverter modulation factor $I_{out\_r}$ and the current phase command $\theta_{Iout}$ determined by the magnitude of the output current command vector and a phase.

"$\theta_0$" represents the angle formed by the output current command vector and the current vector $Ia_{out}$, and "Tsi" represents a period of PWM control. "$T_{ia}$" and "$T_{ib}$" represent the output durations of the effective vectors $Ia_{out}$ and $Ib_{out}$, respectively. "$Tz_{out}$" represents the output duration of a zero vector.

$$T_{ia} = Tsi \cdot I_{out\_r} \cdot \sin(\pi/3 - \theta_0) \tag{1}$$

$$T_{ib} = Tsi \cdot I_{out\_r} \cdot \sin(\theta_0) \tag{2}$$

$$Tz_{out} = Tsi - T_{ia} - T_{ib} \tag{3}$$

FIG. 4 is a spatial vector diagram of the output side of the power converting apparatus 1. For example, in a case where the inverter modulation factor $I_{out\_r}$ and the current phase command $\theta_{Iout}$ are in the state illustrated in FIG. 4, "$T_{ia}$" represents the output duration of the effective vector Iuw, and "$T_{ib}$" represents the output duration of the effective vector Iuv. "$Tz_{out}$" represents the output duration of a zero vector specified by the zero vector command $Sz_{out}$ among the zero vectors Iuu, Ivv, and Iww.

The second pulse generator 54 generates the switch drive signals S1$i$ to S6$i$ which are based on the current vectors defined in this way, by using pulse width modulation (PWM), and outputs them to the drive signal distributor 55. Hereinafter, a pulse generator which generates switch drive signals by using PWM may be referred to as a PWM pulse generator.

Also, the second pulse generator 54 generates a clock signal CLK1 which rises or falls at the timing of switching from a zero vector to an effective vector or at the timing of switching from an effective vector to a zero vector. The clock signal CLK1 may also be a signal which rises or falls at the timing of switching a current vector to be used.

The first pulse generator 53 generates and outputs the switch drive signals S1$c$ to S6$c$ for AC-to-DC conversion in synchronization with the clock signal CLK1 output from the second pulse generator 54, on the basis of the converter control signal.

Now, the converter control signal will be described. The current command generator 52 generates, as the converter control signal, current vectors $Ia_{in}$ and $Ib_{in}$ constituting an input current command vector, a current phase command $\theta_{Iin}$, and a zero vector command $Sz_{in}$, and outputs them to the first pulse generator 53.

Figure 5:
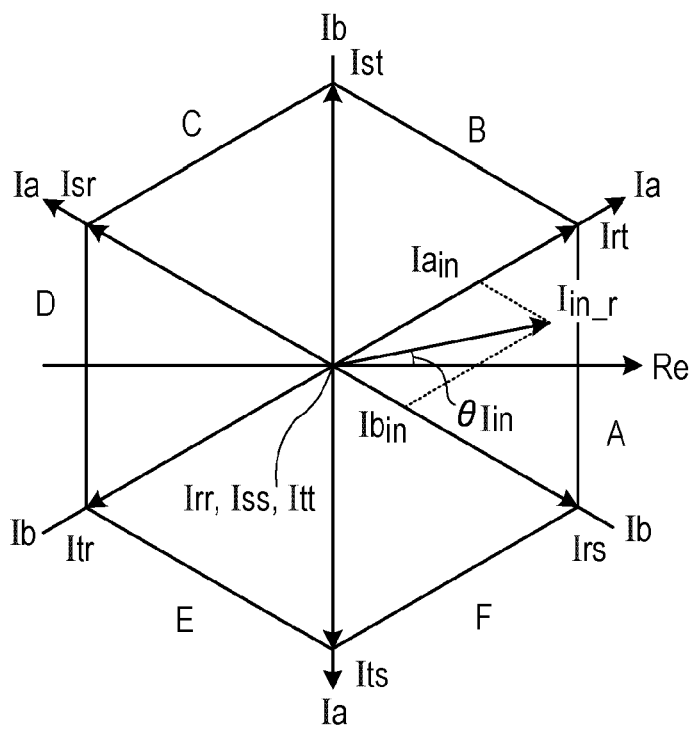
FIG. 5 is a spatial vector diagram of an input side of the power converting apparatus according to the first embodiment.

On the basis of the converter control signal, the first pulse generator 53 generates and outputs switch drive signals S1$c$ to S6$c$ which are based on nine current vectors Irt, Irs, Its, Itr, Isr, Ist, Irr, Iss, and Itt illustrated in FIG. 5.

Among the nine current vectors, the current vectors Irt, Irs, Its, Itr, Isr, and Ist are effective vectors corresponding to currents between different input phases, and the current vectors Irr, Iss, and Itt are zero vectors corresponding to an identical input phase. For example, the effective vector Irt is a current vector corresponding to a current between R-phase and T-phase. The zero vector Irr is a current vector of zero magnitude corresponding to R-phase. As illustrated in FIG. 5, the effective vectors are classified into any one of two types: $Ia_{in}$ vector and $Ib_{in}$ vector.

The first pulse generator 53 generates the switch drive signals S1$c$ to S6$c$ by using one zero vector adjacent to the input current command vector and two non-zero effective vectors $Ia_{in}$ and $Ib_{in}$.

The input current command vector is, for example, when a current of an input phase has a sinusoidal wave, a vector which rotates in the vector space illustrated in FIG. 5 at an angular velocity determined by a current frequency of the input phase. A converter modulation factor $I_{in\_r}$ described below expresses the magnitude of the input current command vector which takes the value of one when the magnitude of the input current command vector matches the radius of an inscribed circle of the hexagon illustrated in FIG. 5.

The output durations of the current vectors used for generating the switch drive signals S1c to S6c in the first pulse generator 53 are defined as expressed by the following equations (4) to (6), in accordance with the converter modulation factor $I_{in\_r}$ and the current phase command $\theta_{Iin}$ determined by the magnitude of the input current command vector and a phase.

"$\theta_i$" represents the angle formed by the input current command vector and the current vector $Ia_{in}$, and "Tsc" represents a control period. "$T_{ca}$" and "$T_{cb}$" represent the output durations of the effective vectors $Ia_{in}$ and $Ib_{in}$, respectively. "$Tz_{in}$" represents the output duration of a zero vector.

$$T_{ca} = Tsc \cdot I_{in\_r} \cdot \sin(\pi/3 - \theta_i) \quad (4)$$

$$T_{cb} = Tsc \cdot I_{in\_r} \cdot \sin(\theta_i) \quad (5)$$

$$Tz_{in} = Tsc - T_{ca} - T_{cb} \quad (6)$$

FIG. 5 is a spatial vector diagram of the input side of the power converting apparatus 1. For example, in a case where the converter modulation factor $I_{in\_r}$ and the current phase command $\theta_{Iin}$ are in the state illustrated in FIG. 5, "$T_{ca}$" represents the output duration of the effective vector Irt, and "$T_{cb}$" represents the output duration of the effective vector Irs. "$Tz_{in}$" represents the output duration of a zero vector specified by the zero vector command $Sz_{in}$ among the zero vectors Irr, Iss, and Itt.

The first pulse generator 53 generates the switch drive signals S1c to S6c which are based on the current vectors defined in this way, by using ΔΣ modulation described below, and outputs them to the drive signal distributor 55.

The drive signal distributor 55 generates the switch drive signals S1R to S6R, S1S to S6S, and S1T to S6T by calculating the logical product of the switch drive signals S1c to S6c for AC-to-DC conversion and the switch drive signals S1i to S6i for DC-to-AC conversion.

Specifically, the drive signal distributor 55 generates the switch drive signals S1R to S6R, S1S to S6S, and S1T to S6T by calculating logical product expressed by equations (7). The drive signal distributor 55 outputs the switch drive signals S1R to S6R, S1S to S6S, and S1T to S6T generated in this way to the power converter 2, thereby causing the power converter 2 to perform power conversion.

$$S1R = S4c \cdot S1i \quad S3R = S4c \cdot S3i \quad S5R = S4c \cdot S5i$$

$$S4R = S1c \cdot S4i \quad S6R = S1c \cdot S6i \quad S2R = S1c \cdot S2i$$

$$S1S = S6c \cdot S1i \quad S3S = S6c \cdot S3i \quad S5S = S6c \cdot S5i$$

$$S4S = S3c \cdot S4i \quad S6S = S3c \cdot S6i \quad S2S = S3c \cdot S2i$$

$$S1T = S2c \cdot S1i \quad S3T = S2c \cdot S3i \quad S5T = S2c \cdot S5i$$

$$S4T = S5c \cdot S4i \quad S6T = S5c \cdot S6i \quad S2T = S5c \cdot S2i \quad (7)$$

In this way, the power converting apparatus 1 controls the power converter 2 by using zero vectors and effective vectors. That is, the power converting apparatus 1 controls the power converter 2 in accordance with a current command by using an output mode in which unidirectional switches connecting to different output phases are controlled to supply current between the output phases, and a short-circuit mode in which unidirectional switches connecting to an identical output phase are controlled.

Here, it is assumed that, in the case of performing logical product of the switch drive signals S1c to S6c for AC-to-DC conversion and the switch drive signals S1i to S6i for DC-to-AC conversion, the first pulse generator 53 and the second pulse generator 54 are not synchronized. In this case, the switch drive signals generated through logical product may be pulse signals whose duration is too short to drive the switching elements constituting the unidirectional switches.

For this reason, in the power converting apparatus 1 according to this embodiment, the first pulse generator 53 is constituted by using a ΔΣ modulator, and the first pulse generator 53 is caused to operate in synchronization with the clock signal CLK1 generated by the second pulse generator 54.

This decreases the phenomenon in which the switch drive signals output from the drive signal distributor 55 are pulse signals whose duration is too short to drive the switching elements of the unidirectional switches. Hereinafter, a pulse generator which generates switch drive signals by using ΔΣ modulation may be referred to as a ΔΣ modulation pulse generator.

Figure 6:
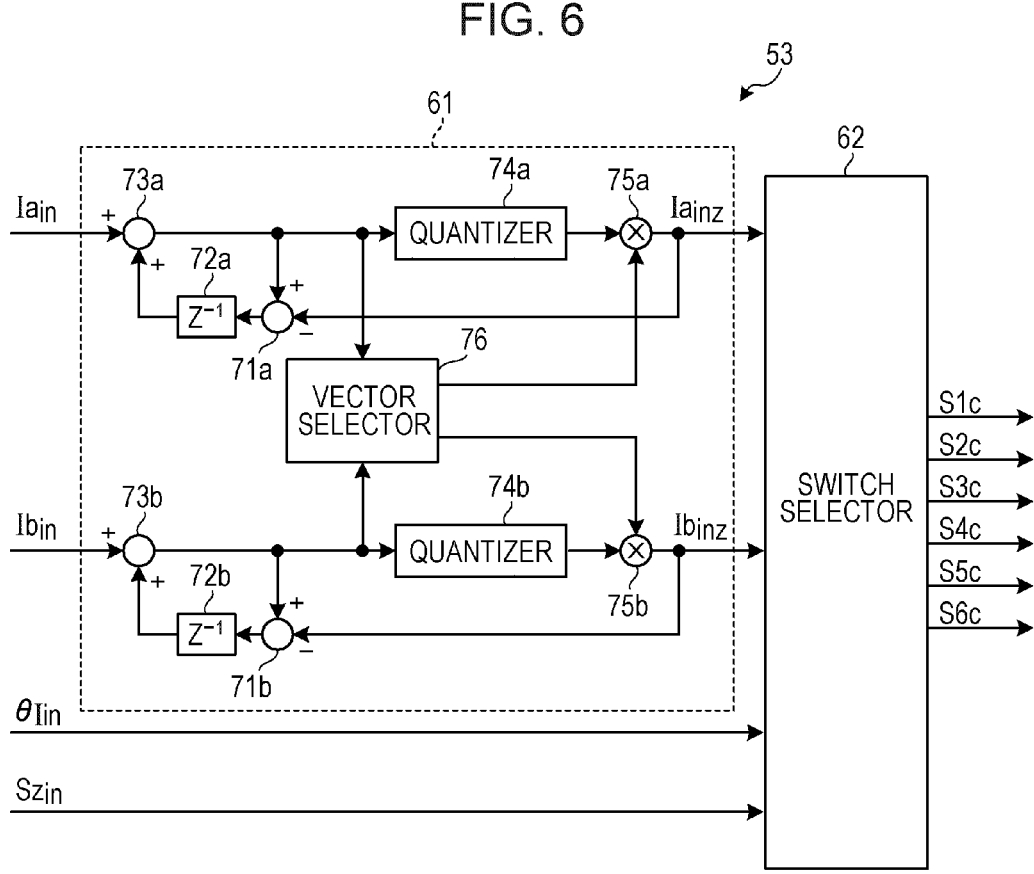
FIG. 6 is a diagram illustrating an example configuration of a first pulse generator according to the first embodiment.

Hereinafter, the configuration of the first pulse generator 53 will be described in detail. FIG. 6 is a diagram illustrating an example configuration of the first pulse generator 53.

As illustrated in FIG. 6, the first pulse generator 53 includes a ΔΣ modulator 61 and a switch selector 62. The ΔΣ modulator 61 and the switch selector 62 perform ΔΣ modulation to generate the switch drive signals S1c to S6c for AC-to-DC conversion and output them, in synchronization with the clock signal CLK1.

The ΔΣ modulator 61 generates current vectors $Ia_{inz}$ and $Ib_{inz}$ by performing ΔΣ modulation on current vectors $Ia_{in}$ and $Ib_{in}$, and outputs the current vectors $Ia_{inz}$ and $Ib_{inz}$. The ΔΣ modulator 61 includes subtracters 71a and 71b, delay devices 72a and 72b, adders 73a and 73b, quantizers 74a and 74b, multipliers 75a and 75b, and a vector selector 76.

The subtracter 71a calculates the difference between an input and an output of the quantizer 74a, and outputs the difference to the delay device 72a. The delay device 72a delays the output of the subtracter 71a by one clock term using the clock signal CLK1, and outputs the result to the adder 73a. The adder 73a adds the output of the delay device 72a, that is, the difference between the input and output of the quantizer 74a before one clock term, to the current vector $Ia_{in}$ received from the current command generator 52, and outputs the result to the quantizer 74a.

The multiplier 75a performs a multiplication process on the output of the quantizer 74a according to a selection signal received from the vector selector 76, and outputs the multiplication result, which is a current vector $Ia_{inz}$, to the switch selector 62.

The subtracter 71b calculates the difference between an input and an output of the quantizer 74b, and outputs the difference to the delay device 72b. The delay device 72b delays the output of the subtracter 71b by one clock term using the clock signal CLK1, and outputs the result to the adder 73b. The adder 73b adds the output of the delay device 72b, that is, the difference between the input and output of the quantizer 74b before one clock term, to the current vector $Ib_{in}$ received from the current command generator 52, and outputs the result to the quantizer 74b.

The multiplier 75b performs a multiplication process on the output of the quantizer 74b according to a selection signal received from the vector selector 76, and outputs the multiplication result, which is a current vector $Ib_{inz}$, to the switch selector 62.

The vector selector 76 compares the input of the quantizer 74a and the input of the quantizer 74b, and outputs a selection signal based on the comparison result to the multipliers 75a and 75b. Specifically, if both the inputs of the quantizer 74a and the quantizer 74b are smaller than a certain threshold, the vector selector 76 outputs "0".

If any one of the inputs of the quantizer 74a and the quantizer 74b is larger than or equal to the certain threshold, the vector selector 76 outputs "1" to the multiplier corresponding to the current vector having the larger value, and outputs "0" to the multiplier corresponding to the current vector having the smaller value. The certain threshold is an adjustable amount to be set, and can be set from the outside, for example.

For example, in a case where the certain threshold is "0.5", the input of the quantizer 74a is "0.3", and the input of the quantizer 74b is "0.4", the vector selector 76 outputs "0" to the multipliers 75a and 75b. In a case where the certain threshold is "0.6", the input of the quantizer 74a is "0.7", and the input of the quantizer 74b is "0.5", the vector selector 76 outputs "1" to the multiplier 75a and outputs "0" to the multiplier 75b.

The switch selector 62 determines zero vectors and effective vectors on the basis of current vectors $Ia1_{inz}$ and $In1_{inz}$, the current phase command $\theta_{Iin}$, and the zero vector command $Sz_{in}$. Then, the switch selector 62 generates and outputs the switch drive signals S1c to S6c which are based on the current vectors determined in this way.

As described above, the first pulse generator 53 operates in synchronization with the clock signal CLK1 output from the second pulse generator 54. Thus, the switch drive signals S1c to S6c output from the switch selector 62 synchronize with the switch drive signals S1i to S6i output from the second pulse generator 54.

Accordingly, the drive signal distributor 55 generates the switch drive signals S1R to S6R, S1S to S6S, and S1T to S6T by calculating logical product of the switch drive signals S1i to S6i and the switch drive signals S1c to S6c which synchronize with each other. This decreases the phenomenon in which the switch drive signals S1R to S6R, S1S to S6S, and S1T to S6T output from the drive signal distributor 55 are pulse signals whose duration is too short to drive the switching elements of the unidirectional switches.

Second Embodiment

Next, a power converting apparatus according to a second embodiment will be described. The power converting apparatus according to the second embodiment is different from the power converting apparatus 1 according to the first embodiment in that a selective harmonic elimination (SHE) modulator which operates in synchronization with a clock signal CLK1 is used as a first pulse generator. The elements corresponding to the elements in the above-described first embodiment are denoted by the same reference numerals, and the description which overlaps that of the first embodiment is omitted as appropriate.

Figure 7:
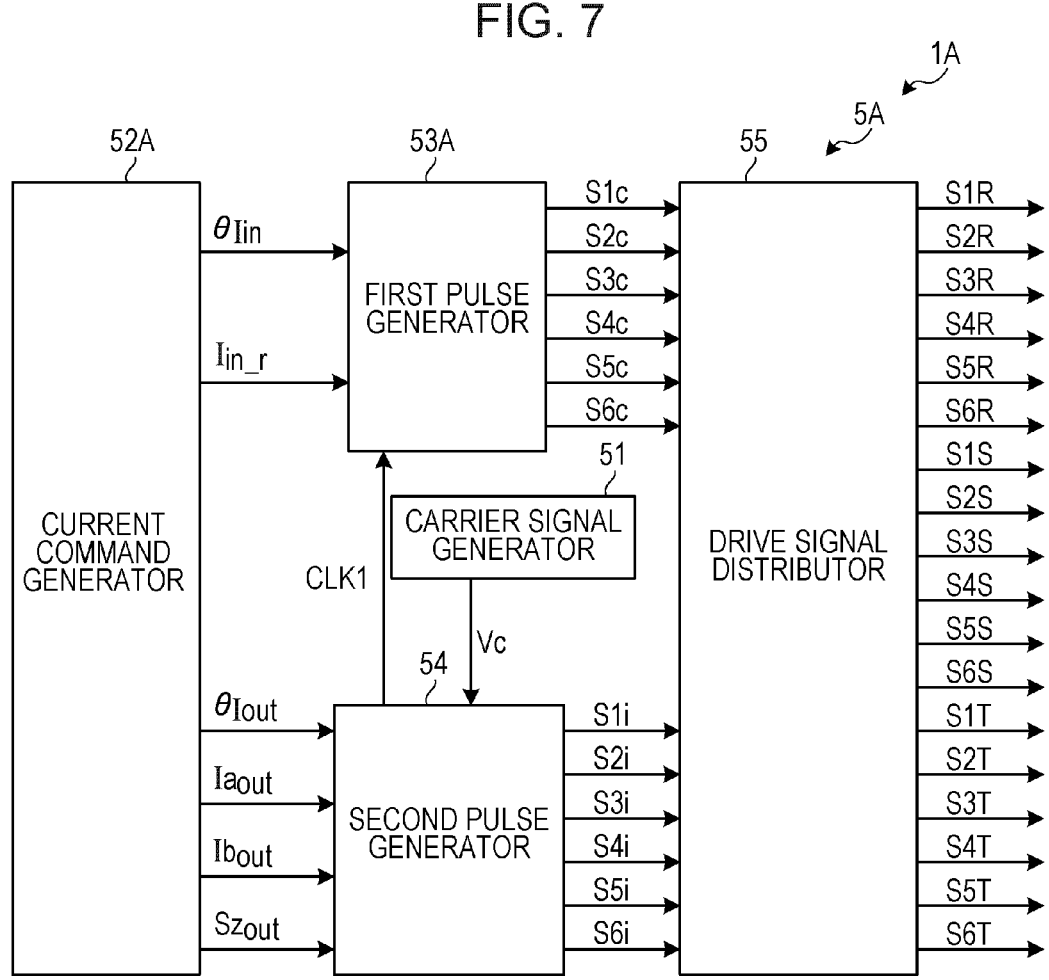
FIG. 7 is a diagram illustrating an example configuration of a controller according to a second embodiment.

FIG. 7 is a diagram illustrating an example configuration of a controller of the power converting apparatus according to the second embodiment. As illustrated in FIG. 7, a controller 5A of a power converting apparatus 1A according to the second embodiment includes a carrier signal generator 51, a current command generator 52A, a first pulse generator 53A, a second pulse generator 54, and a drive signal distributor 55. The first pulse generator 53A corresponds to an example of the first signal generator.

The current command generator 52A generates, as a converter control signal, a converter modulation factor $I_{in\_r}$ and a current phase command $\theta_{Iin}$, and outputs them to the first pulse generator 53A.

The first pulse generator 53A generates switch drive signals S1c to S6c which are based on nine current vectors Irt, Irs, Its, Itr, Isr, Ist, Irr, Iss, and Itt on the basis of the converter modulation factor $I_{in\_r}$ and the current phase command $\theta_{Iin}$, and outputs them.

The first pulse generator 53A is a SHE modulator, and stores, in a storage provided therein, data of switch drive signals constituting a switching pattern generating small current distortion with respect to a current phase command and a converter modulation factor in advance. The first pulse generator 53A reads out, from the storage provided therein, the data of the switch drive signals corresponding to the converter modulation factor $I_{in\_r}$ and the current phase command $\theta_{Iin}$ received from the current command generator 52A and outputs the data to the drive signal distributor 55, in synchronization with the clock signal CLK1.

Figure 8:
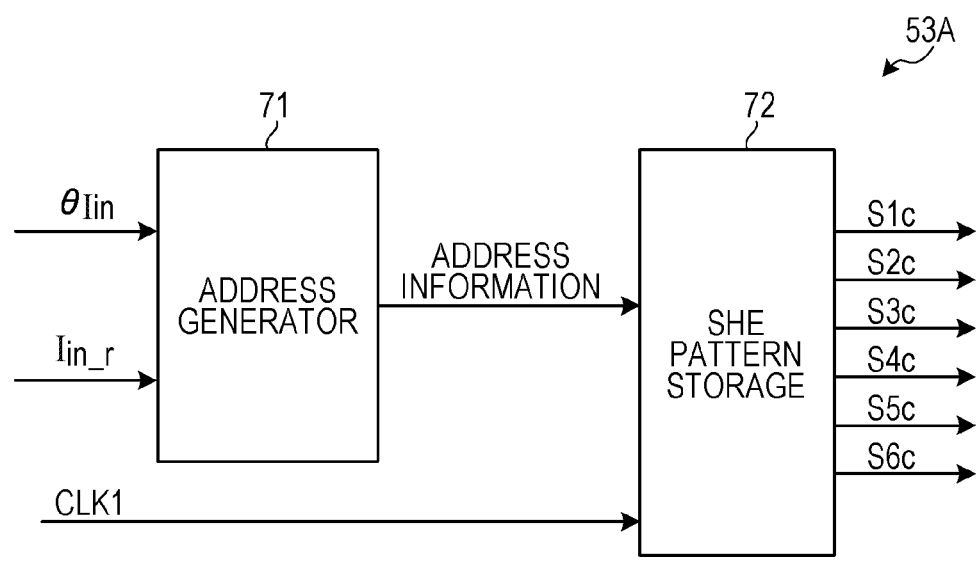
FIG. 8 is a diagram illustrating an example configuration of a first pulse generator according to the second embodiment.

Hereinafter, the configuration of the first pulse generator 53A will be described in detail. FIG. 8 is a diagram illustrating an example configuration of the first pulse generator 53A.

As illustrated in FIG. 8, the first pulse generator 53A includes an address generator 71 and a SHE pattern storage 72, and operates in synchronization with the clock signal CLK1 generated by the second pulse generator 54.

The address generator 71 stores address information which is decided by the current phase command $\theta_{Iin}$ and the converter modulation factor $I_{in\_r}$, and outputs address information corresponding to the converter modulation factor $I_{in\_r}$ and the current phase command $\theta_{Iin}$ received from the current command generator 52A.

The SHE pattern storage 72 stores data of the switch drive signals S1c to S6c which are based on the address information. The SHE pattern storage 72 reads out and outputs the data of the switch drive signals S1c to S6c which are based on the address information received from the address generator 71, in synchronization with the clock signal CLK1.

The data of the switch drive signals S1c to S6c stored in the SHE pattern storage 72 corresponds to switch drive signals having a switching pattern selected to reduce current distortion. For example, the number of pulses of switch drive signals to be output in a $\pi/3$ period of an input voltage phase angle is predetermined, and patterns of switch drive signals which reduce the input current harmonics with respect to the input voltage phase angle are stored in the form of a table in the SHE pattern storage 72. Accordingly, the switch drive signals S1c to S6c for reducing distortion of an input current are selected from the SHE pattern storage 72 and are output to the drive signal distributor 55.

In this way, the first pulse generator 53A operates in synchronization with the clock signal CLK1 output from the second pulse generator 54. Thus, the switch drive signals S1c to S6c output from the SHE pattern storage 72 synchronize with the switch drive signals S1i to S6i output from the second pulse generator 54.

Therefore, the power converting apparatus 1A according to the second embodiment is capable of, like the power converting apparatus 1 according to the first embodiment, decreasing the phenomenon in which the switch drive signals S1R to S6R, S1S to S6S, and S1T to S6T are pulse signals whose duration is too short to drive the switching elements of the unidirectional switches.

Third Embodiment

Next, a power converting apparatus according to a third embodiment will be described. The power converting apparatus according to the third embodiment is different from the power converting apparatus 1 according to the first embodiment in that not only a first pulse generator but also a second pulse generator are pulse generators which perform $\Delta\Sigma$ modulation. The elements corresponding to the elements in the above-described first embodiment are denoted by the same reference numerals, and the description which overlaps that of the first embodiment is omitted as appropriate.

Figure 9:
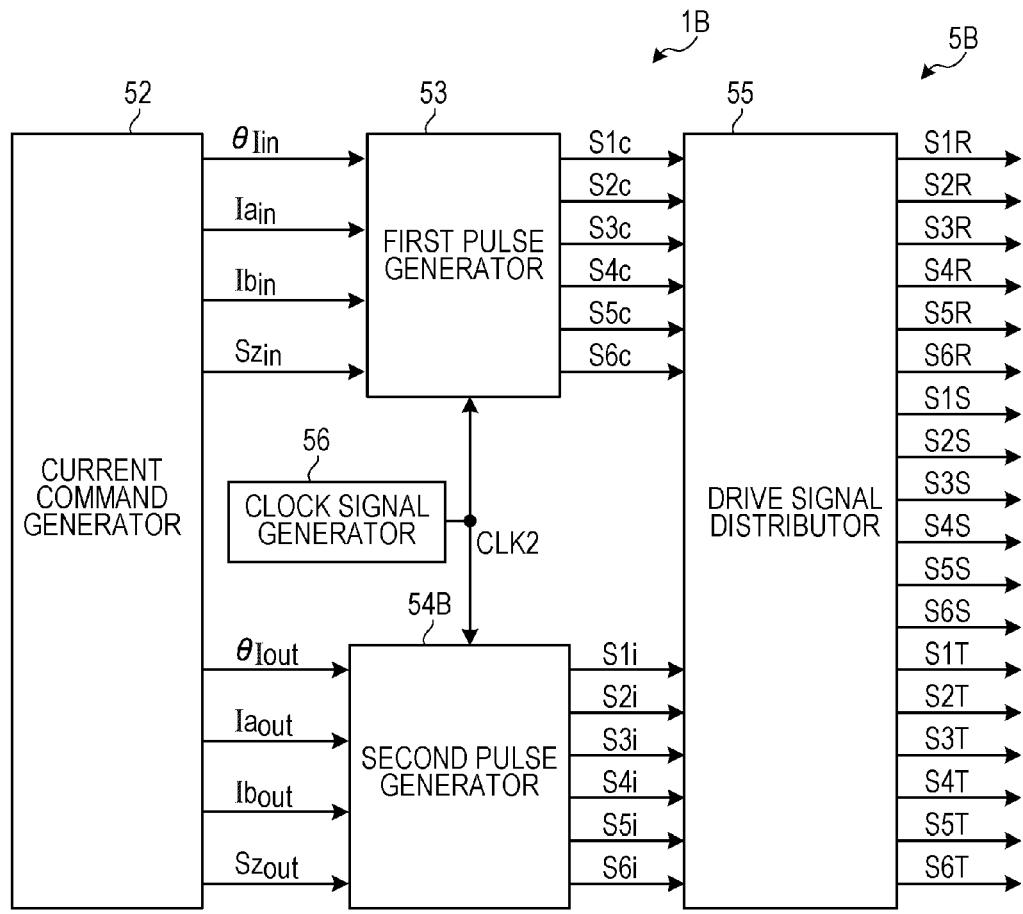
FIG. 9 is a diagram illustrating an example configuration of a controller according to a third embodiment.

FIG. 9 is a diagram illustrating an example configuration of a controller of the power converting apparatus according to the third embodiment. As illustrated in FIG. 9, a controller 5B of a power converting apparatus 1B according to the third embodiment includes a current command generator 52, a first pulse generator 53, a second pulse generator 54B, a drive signal distributor 55, and a clock signal generator 56. The second pulse generator 54B corresponds to an example of the second signal generator.

Like the first pulse generator 53 according to the first embodiment, the second pulse generator 54B performs ΔΣ modulation. Specifically, the second pulse generator 54B includes a ΔΣ modulator which performs ΔΣ modulation on current vectors $Ia_{out}$ and $Ib_{out}$, and a switch selector which generates switch drive signals S1i to S6i in accordance with an output of the ΔΣ modulator.

The second pulse generator 54B generates the switch drive signals S1i to S6i in synchronization with a clock signal CLK2 output from the clock signal generator 56. Likewise, the first pulse generator 53 generates switch drive signals S1c to S6c in synchronization with the clock signal CLK2.

Therefore, the power converting apparatus 1B according to the third embodiment is capable of, like the power converting apparatus 1 according to the first embodiment, decreasing the phenomenon in which the switch drive signals S1R to S6R, S1S to S6S, and S1T to S6T are pulse signals whose duration is too short to drive the switching elements of the unidirectional switches.

Fourth Embodiment

Next, a power converting apparatus according to a fourth embodiment will be described. The power converting apparatus according to the fourth embodiment is different from the power converting apparatus 1 according to the first embodiment in that a ΔΣ modulation pulse generator can be selectively applied to any one of a current-source inverter side and a current-source converter side. The elements corresponding to the elements in the above-described first embodiment are denoted by the same reference numerals, and the description which overlaps that of the first embodiment is omitted as appropriate.

Figure 10:
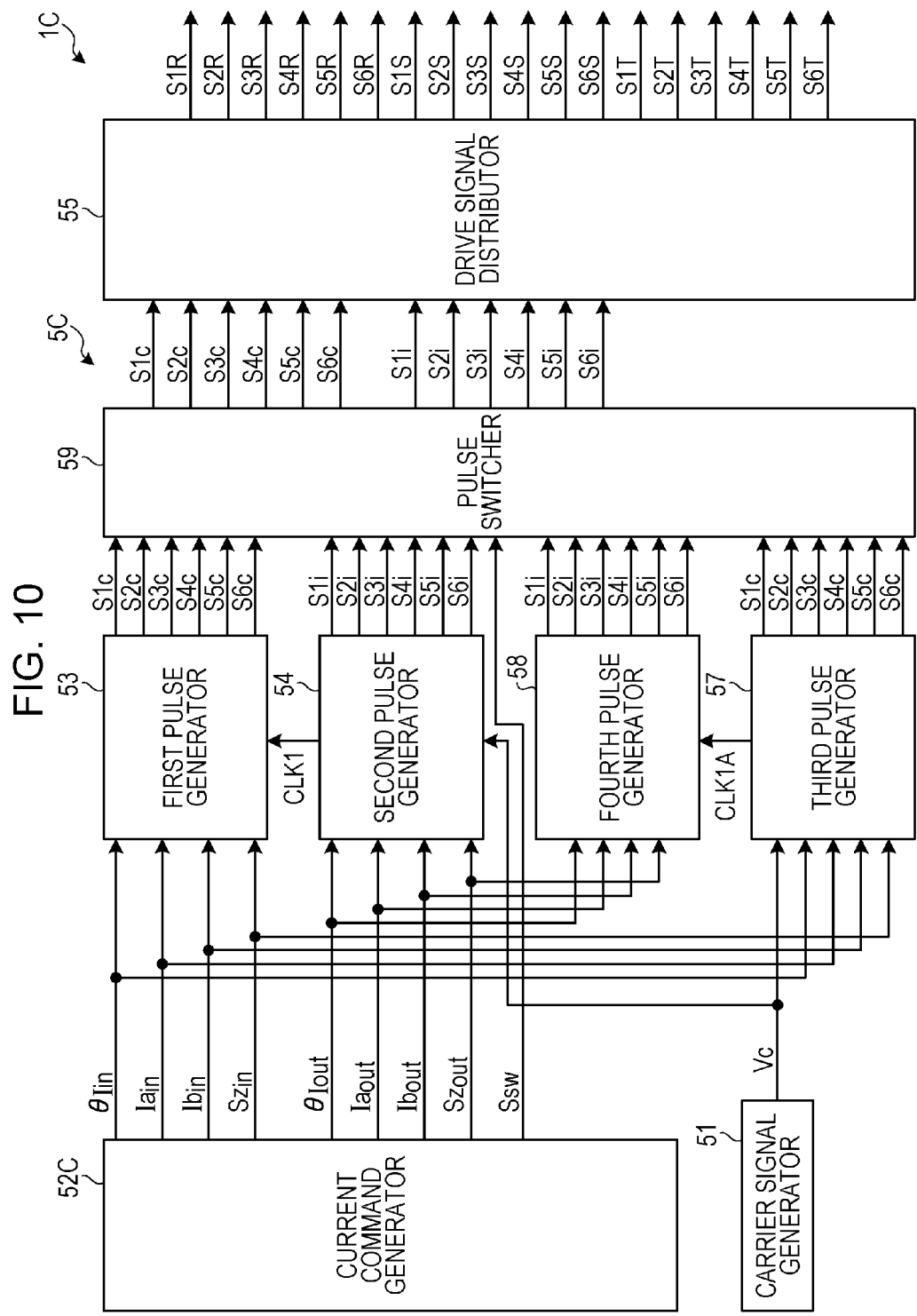
FIG. 10 is a diagram illustrating an example configuration of a controller according to a fourth embodiment.

FIG. 10 is a diagram illustrating an example configuration of a controller of the power converting apparatus according to the fourth embodiment. As illustrated in FIG. 10, a controller 5C of a power converting apparatus 1C according to the fourth embodiment includes a carrier signal generator 51, a current command generator 52C, a first pulse generator 53, a second pulse generator 54, and a drive signal distributor 55. Furthermore, the controller 5C includes a third pulse generator 57, a fourth pulse generator 58, and a pulse switcher 59.

The third pulse generator 57 corresponds to an example of a third signal generator, and the fourth pulse generator 58 corresponds to an example of a fourth signal generator. The pulse switcher 59 corresponds to an example of a signal switcher.

Like the current command generator 52 according to the first embodiment, the current command generator 52C generates and outputs a control signal for the current-source converter side, and generates and outputs a control signal for the current-source inverter side. The converter control signal is input to the third pulse generator 57 in addition to the first pulse generator 53. The inverter control signal is input to the fourth pulse generator 58 in addition to the second pulse generator 54.

On the basis of the converter control signal, the third pulse generator 57 generates and outputs switch drive signals S1c to S6c which are based on nine current vectors Irt, Irs, Its, Itr, Isr, Ist, Irr, Iss, and Itt.

Also, the third pulse generator 57 generates a clock signal CLK1A which rises or falls at the timing of switching from a zero vector to an effective vector or at the timing of switching from an effective vector to a zero vector.

The fourth pulse generator 58 includes a ΔΣ modulator and a switch selector, like the second pulse generator 54B. The fourth pulse generator 58 generates and outputs switch drive signals S1i to S6i on the basis of the inverter control signal in synchronization with the clock signal CLK1A output from the third pulse generator 57.

The pulse switcher 59 selects the switch drive signals output from the first pulse generator 53 and the second pulse generator 54 or the switch drive signals output from the third pulse generator 57 and the fourth pulse generator 58, on the basis of a pulse switch command Ssw. The pulse switcher 59 outputs the selected switch drive signals to the drive signal distributer 55.

For example, it is assumed that the pulse switch command Ssw output from the current command generator 52C is "Low". In this case, the pulse switcher 59 selects the switch drive signals S1c to S6c output from the first pulse generator 53 and the switch drive signals S1i to S6i output from the second pulse generator 54, and outputs them to the drive signal distributor 55.

Also, it is assumed that the pulse switch command Ssw output from the current command generator 52C is "High". In this case, the pulse switcher 59 selects the switch drive signals S1c to S6c output from the third pulse generator 57 and the switch drive signals S1i to S6i output from the fourth pulse generator 58, and outputs them to the drive signal distributor 55.

In this way, in the power converting apparatus 1C according to the fourth embodiment, a PWM pulse generator can be selectively used for one of the current-source converter side and the current-source inverter side, and a ΔΣ modulation pulse generator can be selectively used for the other.

In a case where a ΔΣ modulation pulse generator is used for the current-source inverter side, compared to a case where a PWM pulse generator is used for the current-source inverter side, it is difficult for the power converting apparatus 1C to output low voltage. This is because the lower limit of the output voltage depends on the ratio of an output frequency to the minimum pulse width on the current-source converter side.

In a case where the ΔΣ modulation pulse generator is synchronized with a clock signal generated by the PWM pulse generator using the above-described method, the pulse width becomes larger than a carrier half-period of a PWM pulse. Thus, as in a case of the first embodiment where ΔΣ modulation is used on the current-source converter side, the minimum pulse width on the current-source converter side is large, and thus even a voltage of about several volts are not output in some cases.

In the power converting apparatus 1C according to the fourth embodiment, the first pulse generator 53 and the second pulse generator 54 are used in the case of outputting a voltage of a certain value or more, whereas the third pulse generator 57 and the fourth pulse generator 58 are used in the case of outputting a voltage of less than the certain value.

In this way, the power converting apparatus 1C uses, in the case of outputting a low voltage, a PWM pulse generator on the current-source converter side and a ΔΣ modulation pulse generator on the current-source inverter side. Accordingly, a low voltage can be output while decreasing the phenomenon in which the switch drive signals S1R to S6R, S1S to S6S, and S1T to S6T are pulse signals whose duration is too short to drive the switching elements of the unidirectional switches.

ΔΣ modulation pulse generators are used as the first pulse generator 53 and the fourth pulse generator 58 in the fourth embodiment. Alternatively, one or both of them may be a SHE modulation pulse generator.

Fifth Embodiment

Next, a power converting apparatus according to a fifth embodiment will be described. The power converting apparatus according to the fifth embodiment is different from the power converting apparatus according to the first embodiment in that a zero vector fixing processor is added to the power converting apparatus according to the first embodiment. The elements corresponding to the elements in the above-described first embodiment are denoted by the same reference numerals, and the description which overlaps that of the first embodiment is omitted as appropriate.

In the above-described power converting apparatus 1 according to the first embodiment, change in state of the drive signals S1c to S6c of the current-source converter are synchronized with change in state of the drive signals S1i to S6i of the current-source inverter, so that switch drive signals are not pulse signals with short durations. However, if the state of the drive signals S1i to S6i of the current-source inverter is changed immediately after the state of the drive signals S1c to S6c of the current-source converter is changed, the switch drive signals become pulse signals with short durations. Therefore, in the power converting apparatus according to the fifth embodiment, a zero vector fixing processor is introduced.

Figure 11:
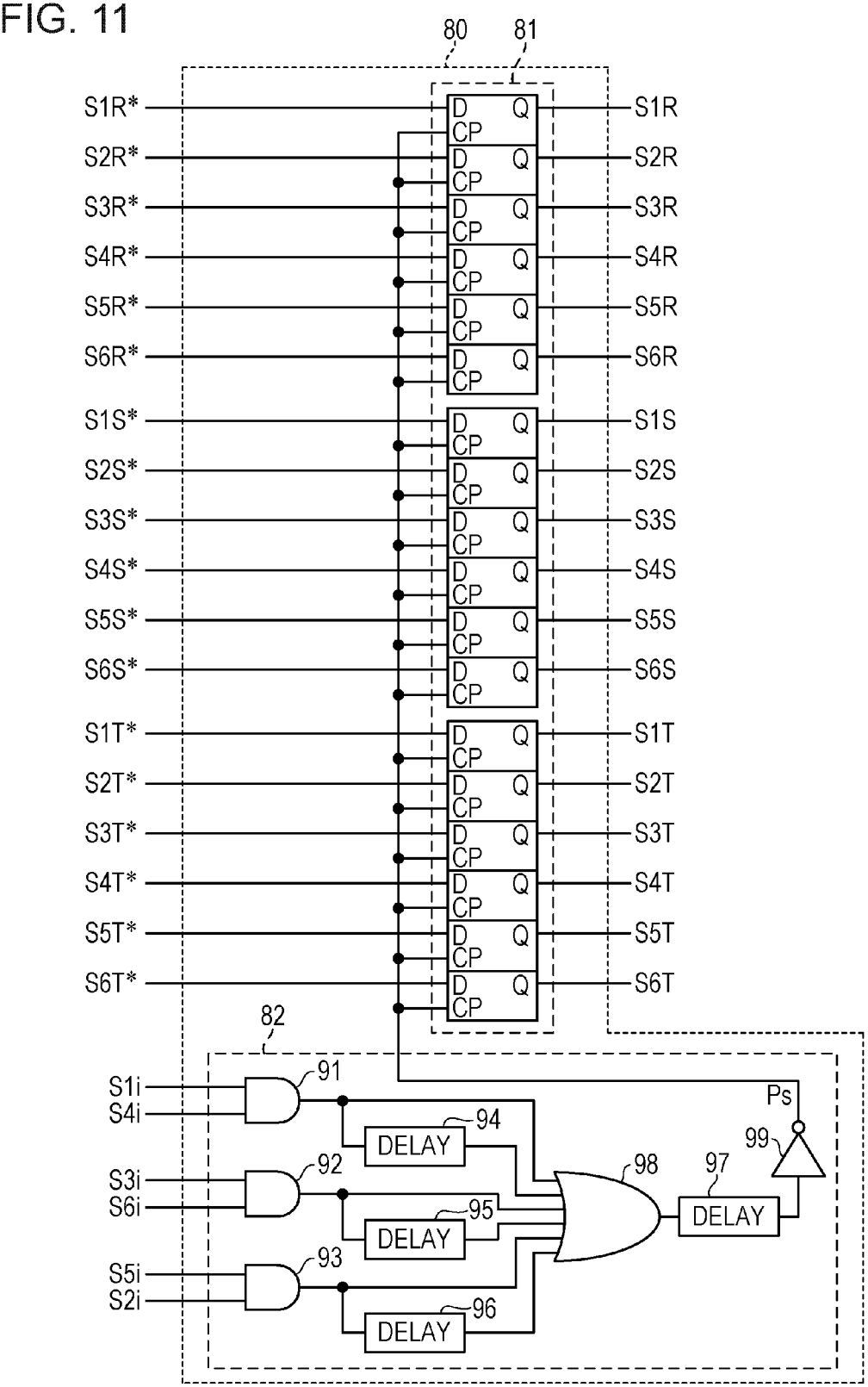
FIG. 11 is a diagram illustrating an example configuration of a zero vector fixing processor according to a fifth embodiment.

FIG. 11 is a diagram illustrating an example configuration of a zero vector fixing processor of the power converting apparatus according to the fifth embodiment. The zero vector fixing processor is provided between the above-described drive signal distributor 55 and power converter 2, and is added to the controller 5 of the power converting apparatus 1 according to the first embodiment. The zero vector fixing processor can also be added to the controller of the power converting apparatus according to the second, third, or fourth embodiment. Here, the configuration of the zero vector fixing processor will be described, and description of the configuration of the other part of the controller is omitted.

As illustrated in FIG. 11, a zero vector fixing processor 80 of the power converting apparatus according to the fifth embodiment includes a D-latch circuit section 81 and a zero vector detector 82. The zero vector fixing processor 80 is an example of a signal processor. Here, for the convenience of description, the switch drive signals S1R to S6R, S1S to S6S, and S1T to S6T output from the drive signal distributor 55 are denoted by S1R* to S6R*, S1S* to S6S*, and S1T* to S6T*.

The D-latch circuit section 81 includes eighteen D-latch circuits corresponding to the switch drive signals S1R* to S6R*, S1S* to S6S*, and S1T* to S6T*. The individual D-latch circuits latch the switch drive signals S1R* to S6R*, S1S* to S6S*, and S1T* to S6T* when a clock signal Ps (described below) output from the zero vector detector 82 is "Low". At this time, the switch drive signals S1R to S6R, S1S to S6S, and S1T to S6T output from the zero vector fixing processor 80 are maintained in a latched state.

Thus, in a state where the clock signal Ps is "Low", even if any of the switch drive signals S1R* to S6R*, S1S* to S6S*, and S1T* to S6T* are changed, the switch drive signals S1R to S6R, S1S to S6S, and S1T to S6T output from the zero vector fixing processor 80 do not change.

The zero vector detector 82 detects that the switch drive signals S1i to S6i corresponding to the zero vectors Iuu, Ivv, and Iww have been output from the second pulse generator 54, and then outputs a clock signal Ps which is "Low" for a certain time width to the D-latch circuit section 81. For example, when the switch drive signals S1i and S4i corresponding to the zero vector Iuu becomes "High", which is an ON command, the zero vector detector 82 outputs a clock signal Ps which is "Low" for a certain time width to the D-latch circuit section 81.

As illustrated in FIG. 11, the zero vector detector 82 includes AND circuits 91 to 93, delay circuits 94 to 97, an OR circuit 98, and a NOT circuit 99. The AND circuit 91 receives the switch drive signals S1i and S4i, and outputs a "High" signal representing detection of the zero vector Iuu when both the switch drive signals S1i and S4i are "High". The AND circuit 92 outputs a "High" signal representing detection of the zero vector Iww when both the switch drive signals S3i and S6i are "High". The AND circuit 93 outputs a "High" signal representing detection of the zero vector Ivv when both the switch drive signals S2i and S5i are "High".

When any of the AND circuits 91 to 93 detects a zero vector, the delay circuits 94 to 96 and the OR circuit 98 cause a signal which is "High" for a certain period to be output from the OR circuit 98. The signal output from the OR circuit 98 is delayed by the delay circuit 97, is inverted by the NOT circuit 99, and is input to the individual latch circuits of the D-latch circuit section 81.

In this way, when detecting that the current-source inverter side has been brought into the state of outputting a zero vector, the zero vector fixing processor 80 causes the D-latch circuits to hold the switch drive signals S1R to S6R, S1S to S6S, and S1T to S6T. Thus, the switch drive signals S1R to S6R, S1S to S6S, and S1T to S6T are held while a zero vector is being output on the inverter side.

A configuration is made so that a zero vector on the current-source inverter side is generated in the vicinity of a peak (maximum value) or a bottom (minimum value) of a carrier signal Vc. In the configuration, if the zero vector fixing processor 80 is not provided, it is possible that a zero vector on the current-source inverter side changes in the vicinity of the timing at which the carrier signal Vc has a maximum or minimum value, and the switch drive signals S1i to S6i change. In this case, it is likely that a current vector on the current-source converter side and a current vector on the current-source inverter side change in succession at a short time interval.

On the other hand, in the power converting apparatus according to the fifth embodiment, the zero vector fixing processor 80 is provided. Thus, even if a zero vector on the current-source inverter side changes in the vicinity of the timing at which the carrier signal Vc has a maximum or minimum value, change of the zero vector is forcibly inhibited and the same zero vector is output, and thus the switch drive signals S1R to S6R, S1S to S6S, and S1T to S6T do not change as long as the current-source inverter outputs a zero vector. Therefore, a current vector on the current-source converter side and a current vector on the current-source inverter side do not change in succession at a short time interval. That is, the phenomenon in which the switch drive signals output to the power converter 2 are pulse signals whose duration is too short to drive the switching elements of the unidirectional switches can be decreased.

Description has been given of an example of the case where a ΔΣ modulation pulse generator is used on the current-source converter side and a PWM pulse generator is used on the current-source inverter side, but the present disclosure is not limited thereto. For example, in a case where a PWM pulse generator is used on the current-source converter side and a ΔΣ modulation pulse generator is used on the current-source inverter side, as in the power converting apparatus 1C according to the fourth embodiment, a zero vector on the current-source converter side is detected on the basis of the switch drive signals S1c to S6c.

Also, the switch drive signals S1R to S6R, S1S to S6S, and S1T to S6T are sampled and held during a period of the zero vector on the current-source converter side. Accordingly, generation of short duration pulses of about several nanoseconds, caused by a circuit delay, in the switch drive signals S1R to S6R, S1S to S6S, and S1T to S6T can be suppressed.

Description has been given of the case where the zero vector fixing processor 80 is added to the power converting apparatus 1 according to the first embodiment. However, it is of course possible to add the zero vector fixing processor 80 to the power converting apparatus 1A, 1B, or 1C according to the second, third, or fourth embodiment. Also, description has been given of the case where the switch drive signals S1R to S6R, S1S to S6S, and S1T to S6T are sampled and held. However, the switch drive signals S1i to S6i and the switch drive signals S1c to S6c may be sampled and held.

Sixth Embodiment

Next, a power converting apparatus according to a sixth embodiment will be described. The power converting apparatus according to the sixth embodiment is different from the power converting apparatuses according to the above-described embodiments in that an input-phase voltage detector, an output-phase voltage detector, and a zero vector selector are provided in addition to the configuration of the power converting apparatuses according to the above-described embodiments. The elements corresponding to the elements in the above-described embodiments are denoted by the same reference numerals, and the description which overlaps that of the above-described embodiments is omitted as appropriate.

FIG. 12 is a diagram illustrating an example configuration of the power converting apparatus according to the sixth embodiment. As illustrated in FIG. 12, a power converting apparatus 1E according to the sixth embodiment includes a power converter 2, a controller 5E, an input-phase voltage detector 6, and an output-phase voltage detector 7. In FIG. 12, illustration of the first filter 3 and the second filter 4 is omitted.

The input-phase voltage detector 6 detects instantaneous voltages of input phases of S-phase, R-phase, and T-phase, and outputs the detection result, that is, input-phase voltage detection values $V_R$, $V_S$, and $V_T$, to the controller 5E. The input-phase voltage detection value $V_R$ is an instantaneous value of the voltage of R-phase, the input-phase voltage detection value $V_S$ is an instantaneous value of the voltage of S-phase, and the input-phase voltage detection value $V_T$ is an instantaneous value of the voltage of T-phase.

The output-phase voltage detector 7 detects instantaneous voltages of output phases of U-phase, V-phase, and W-phase, and outputs the detection result, that is, output-phase voltage detection values $V_U$, $V_V$, and $V_W$, to the controller 5E. The output-phase voltage detection value $V_U$ is an instantaneous value of the voltage of U-phase, the output-phase voltage detection value $V_V$ is an instantaneous value of the voltage of V-phase, and the output-phase voltage detection value $V_W$ is an instantaneous value of the voltage of W-phase.

The controller 5E includes a current command generator 52E which includes a zero vector selector 100. The zero vector selector 100 generates, in accordance with the input-phase voltage detection values $V_R$, $V_S$, and $V_T$ and the output-phase voltage detection values $V_U$, $V_V$, and $V_W$, zero vector commands $Sz_{in}$ and $Sz_{out}$ which suppress an increase in voltage between terminals on the input side and output side whose connection is opened by corresponding unidirectional switches (hereinafter this voltage is referred to as open inter-terminal voltage between the input side and the output side). The zero vector command $Sz_{in}$ is a command for specifying a zero vector on the current-source converter side, and the zero vector command $Sz_{out}$ is a command for specifying a zero vector on the current-source inverter side. In the current command generator 52E, the configuration of the other part is the same as that of the current command generator 52.

The zero vector selector 100 selects the input-phase voltage detection value whose absolute value ($|V_R|$, $|V_S|$, or $|V_T|$) is the largest among the input-phase voltage detection values. Then, the zero vector selector 100 outputs, as a zero vector command $Sz_{in}$, a command for specifying a zero vector which uses the phase corresponding to the input-phase voltage detection value with the largest absolute value.

Also, the zero vector selector 100 detects the voltage polarity of the phase corresponding to the zero vector command $Sz_{in}$. If the detected voltage polarity is positive, the zero vector selector 100 further selects the output-phase voltage detection value whose polarity is positive and which is the largest among the output-phase voltage detection values. The zero vector selector 100 outputs, as a zero vector command $Sz_{out}$, a command for specifying a zero vector which uses the phase corresponding to the selected largest output-phase voltage detection value with positive polarity.

On the other hand, if the detected voltage polarity is negative, the zero vector selector 100 further selects the output-phase voltage detection value whose voltage polarity is negative and which is the smallest among the output-phase voltage detection values. The zero vector selector 100 outputs, as a zero vector command $Sz_{out}$, a command for specifying a zero vector which uses the phase corresponding to the detected smallest output-phase voltage detection value with negative polarity.

The zero vector selector 100 generates the zero vector commands $Sz_{in}$ and $Sz_{out}$ in this way. Accordingly, an increase in open inter-terminal voltage between the input side and the output side can be suppressed.

Now, suppression of an increase in voltage between terminals will be described. When zero vectors are simultaneously output from the current-source converter side and the current-source inverter side, the potential of one of the input terminals $T_R$, $T_S$, and $T_T$ becomes equal to the potential of one of the output terminals $T_U$, $T_V$, and $T_W$.

For example, a case where output zero vectors are a zero vector Itt on the current-source converter side and a zero vector Iuu on the current-source inverter side is discussed. In this case, the switch drive signals S1T and S4T becomes "High", and the unidirectional switches 31 and 32 are turned on. Thus, the DC inductors 37 and 38 are brought into a current circulating state. If the winding voltages of the DC inductors 37 and 38 are zero, a state similar to a state where the input terminal $T_T$ and the output terminal $T_U$ are short-circuited occurs.

Figure 13A:
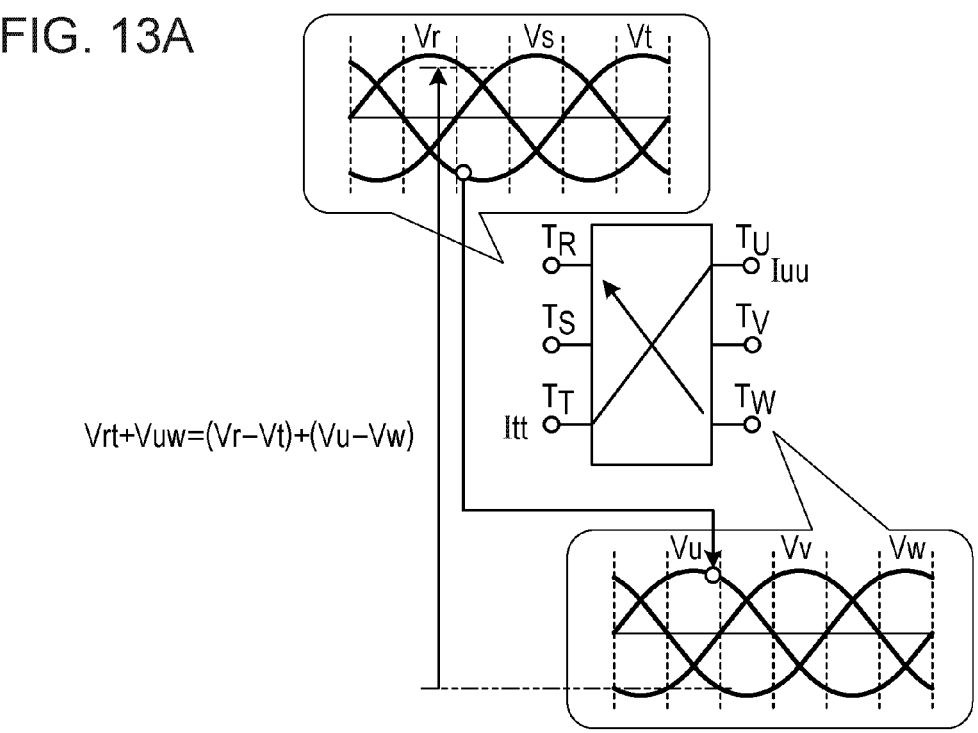
FIG. 13A is a diagram describing a voltage applied to terminals in an open state on an input side and an output side.

In this case, for example, if the voltage between the input terminal $T_R$ and the output terminal $T_W$ is Vrt+Vuw and if Vuw and Vrt are voltages substantially equal to each other, a very high voltage is applied to the unidirectional switch between the input terminal $T_R$ and the output terminal $T_W$ in an open state, as illustrated in FIG. 13A. This causes an issue about the voltage durability of a switching element constituting the unidirectional switch.

Figure 13B:
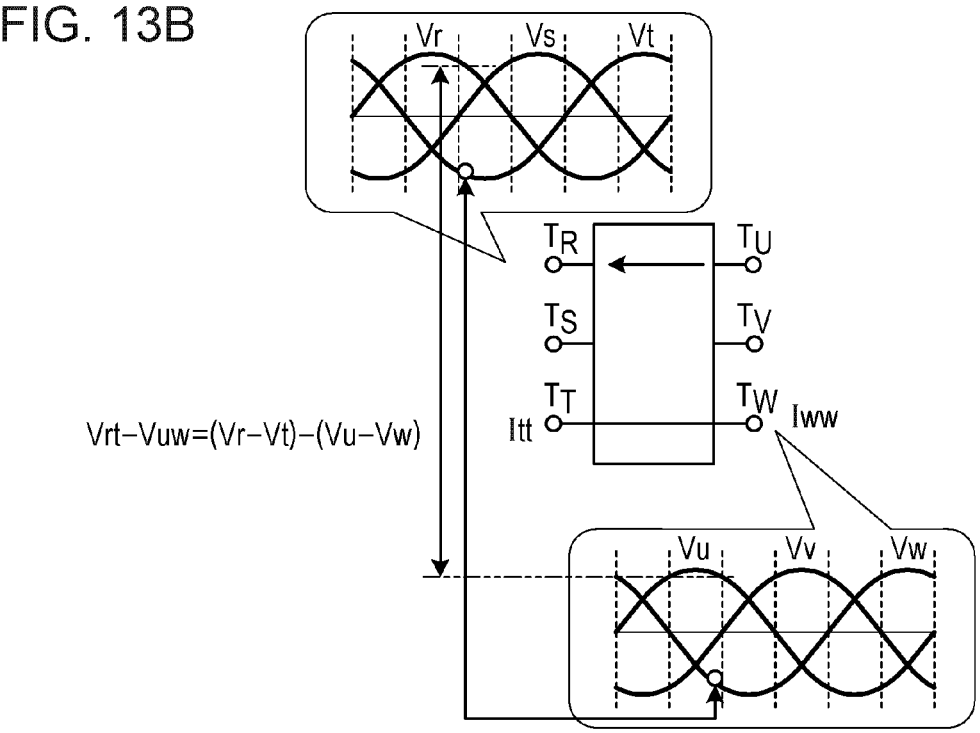
FIG. 13B is a diagram describing a voltage applied to terminals in an open state on an input side and an output side.

Even in such a case, in the power converting apparatus 1E according to the sixth embodiment, a zero vector Iww is regarded as a zero vector on the current-source inverter side, and all the open inter-terminal voltages between the input side and the output side are caused to have the same polarity, as illustrated in FIG. 13B. Thus, the open inter-terminal voltage between the terminals, for example, the input terminal $T_R$ and the output terminal $T_U$, is decreased to Vrt-Vuw, and it can be suppressed that a desired voltage durability for the switching element is much larger than the peak voltage value of input or output.

As illustrated in FIGS. 13A and 13B, among the input phases of R-phase, S-phase, and T-phase, the voltage polarity of the input phase with the largest absolute voltage is opposite to the voltage polarities of the other input phases. Likewise, among the output phases of U-phase, V-phase, and W-phase, the voltage polarity of the output phase with the largest absolute voltage is opposite to the voltage polarities of the other output phases. The zero vector selector 100 performs the above-described process to cause all the open inter-terminal voltages between the input side and the output side to have the same polarity.

Thus, the open inter-terminal voltage between the input side and the output side is a difference voltage between phase voltages of the same polarity. Furthermore, the phase voltage between these terminals has an absolute value that is not the largest but is the second largest or minimum among the three phases, and thus the inter-terminal voltage can be decreased.

In a case where an output-phase voltage is low enough not to cause an issue of voltage durability, the zero vector selector 100 may generate zero vector commands $Sz_{in}$ and $Sz_{out}$ in accordance with a certain rule, without using the input-phase voltage detection values $V_R$, $V_S$, and $V_T$, and the output-phase voltage detection values $V_{UV}$ and $V_{VW}$.

As described above, with the power converting apparatus 1E according to the sixth embodiment, it can be suppressed that a desired voltage durability for the switching element constituting a unidirectional switch in the power converter 2 is much larger than the peak voltage value of input or output.

In the first to sixth embodiments, description has been given of examples of a three-phase input and three-phase output power converting apparatus. However, a power converting apparatus of N-phase input (N is a natural number of 2 or more) and M-phase output (M is a natural number of 2 or more) may be employed. For example, the above-described technology can be applied to a two-phase input and three-phase output power converting apparatus, and a two-phase input and two-phase output power converting apparatus.

In the first to sixth embodiments, description has been given of an example in which the DC inductors 17, 27, and 37 coupled to one another and the DC inductors 18, 28, and 38 coupled to one another are provided. However, at least the DC inductors 17, 27, and 37 may be provided.

Further advantages and modifications can be easily achieved by those skilled in the art. Thus, a broader aspect of the present disclosure is not limited to the specific details and representative embodiments expressed and described above. Therefore, various alterations can be made without deviating from the spirit or scope of the general concept of the present disclosure defined by the appended claims and equivalents thereof.

It should be understood by those skilled in the art that various modifications, combinations, sub-combinations and alterations may occur depending on design requirements and other factors insofar as they are within the scope of the appended claims or the equivalents thereof.

What is claimed is:

1. A power converting apparatus comprising:
a power converter that includes a plurality of unidirectional switches which connect input phases and output phases, and that includes a plurality of switch groups each being provided for one of the input phases, and a plurality of inductors coupled to one another such that current flowing in a winding of a first inductor of the plurality of inductors moves to a second winding in a second inductor of the plurality of inductors with the magnitude of the current maintained, each of the inductors of the plurality of inductors being connected between one of the input phases and a corresponding one of the switch groups; and
a controller that includes a first signal generator which generates switch drive signals for AC-to-DC conversion, a second signal generator which generates switch drive signals for DC-to-AC conversion, and a drive signal generator which generates, in accordance with the switch drive signals for AC-to-DC conversion and the switch drive signals for DC-to-AC conversion, switch drive signals for controlling on and off of the plurality of unidirectional switches, the first signal generator and the second signal generator operating in synchronization with each other.

2. The power converting apparatus according to claim 1, wherein the first signal generator generates the switch drive signals by using pulse width modulation, and
wherein the second signal generator generates the switch drive signals by using Σmodulation.

3. The power converting apparatus according to claim 1, wherein the first signal generator generates the switch drive signals by using pulse width modulation, and
wherein the second signal generator generates the switch drive signals by reading out data which is based on the switch drive signal from a storage.

4. The power converting apparatus according to claim 1, wherein the first signal generator generates the switch drive signals by using Δ modulation, and
wherein the second signal generator generates the switch drive signals by using Δ modulation.

5. The power converting apparatus according to claim 1, wherein the controller includes a signal processor which holds switch drive signals output from the drive signal generator and outputs the switch drive signals to the plurality of unidirectional switches, in accordance with switch drive signals output from the first signal generator.

6. The power converting apparatus according to claim 1, wherein the plurality of unidirectional switches which connect the input phases and the output phases include first unidirectional switches which supply current from an input-phase side to an output-phase side, and second unidirectional switches which supply current from the output-phase side to the input-phase side.

7. The power converting apparatus according to claim 1, wherein a first group of inductors of the plurality of inductors are provided between the input phases and first unidirectional switches, and a second group of inductors of the plurality of inductors are provided between the input phases and second unidirectional switches, the second group of inductors having opposite polarity of induced current from the first group of inductors.

8. The power converting apparatus according to claim 2, wherein the controller includes a third signal generator which generates switch drive signals for AC-to-DC conversion by using Σmodulation, a fourth signal generator which generates switch drive signals for DC-to-AC conversion by using pulse width modulation, and a signal switcher which selects any one of an output of the first signal generator and the second signal generator and an output of the third signal generator and the fourth signal generator and which outputs the selected output to the drive signal generator, wherein the third signal generator and the fourth signal generator operate in synchronization with each other, and wherein the drive signal generator generates signals for controlling on and off of the plurality of unidirectional switches in accordance with switch drive signals output from the signal switcher.

9. The power converting apparatus according to claim 2, wherein the first signal generator generates a clock signal which rises or falls in synchronization with the pulse width modulation, and wherein the second signal generator generates the switch drive signals in synchronization with the clock signal.

10. The power converting apparatus according to claim 2, wherein the controller includes a signal processor which holds switch drive signals output from the drive signal generator in a case where unidirectional switches of an identical phase among the plurality of unidirectional switches are to be controlled, wherein the first signal generator generates a clock signal which rises or falls in synchronization with a timing at which a carrier signal used for pulse width modulation has a maximum or minimum value, and wherein the second signal generator generates the switch drive signals in synchronization with the clock signal.

11. The power converting apparatus according to claim 4, wherein the controller includes a clock signal generator which generates a clock signal, wherein the first signal generator generates the switch drive signals in synchronization with the clock signal, and wherein the second signal generator generates the switch drive signals in synchronization with the clock signal.

12. The power converting apparatus according to claim 7, wherein the first group of inductors are magnetically coupled to one another and the second group of inductors are magnetically coupled to one another.

13. A power converting apparatus comprising:

a power converter that includes a plurality of unidirectional switches which connect input phases and output phases, and that includes a plurality of switch groups each being provided for one of the input phases, and a plurality of inductors coupled to one another such that current flowing in a winding of a first inductor of the plurality of inductors moves to a second winding in a second inductor of the plurality of inductors with the magnitude of the current maintained, the first and second inductors being connected between one of the input phases and a corresponding one of the switch groups; and a controller that controls the power converter in response to a current command by controlling unidirectional switches of different phases among the plurality of unidirectional switches and controlling unidirectional switches of an identical phase among the plurality of unidirectional switches, wherein, in a case where unidirectional switches of the identical input phase among the plurality of unidirectional switches and unidirectional switches of the identical output phase among the plurality of unidirectional switches are simultaneously turned on, the controller selects an identical input phase and an identical output phase so that a voltage polarity of the input phase matches a voltage polarity of the output phase.

14. The power converting apparatus according to claim 13, wherein the plurality of unidirectional switches which connect the input phases and the output phases include first unidirectional switches which supply current from an input-phase side to an output-phase side, and second unidirectional switches which supply current from the output-phase side to the input-phase side.

15. The power converting apparatus according to claim 14, wherein a first group of inductors of the plurality of inductors are provided between the input phases and first unidirectional switches, and a second group of inductors of the plurality of inductors are provided between the input phases and second unidirectional switches, the second group of inductors having opposite polarity of induced current from the first group of inductors.

16. The power converting apparatus according to claim 15, wherein the input-phase side inductors are magnetically coupled to one another and the output-phase side inductors are magnetically coupled to one another.

17. A power converting apparatus comprising:

a power converter that includes a plurality of unidirectional switches which connect input phases and output phases, and that includes a plurality of switch groups each being provided for one of the input phases, and a plurality of inductors coupled to one another, each of the inductors being connected between one of the input phases and a corresponding one of the switch groups; and a controller that includes a first signal generator which generates switch drive signals for AC-to-DC conversion, a second signal generator which generates switch drive signals for DC-to-AC conversion, and a drive signal generator which generates, in accordance with the switch drive signals for AC-to-DC conversion and the switch drive signals for DC-to-AC conversion, switch drive signals for controlling on and off of the plurality of unidirectional switches, the first signal generator and the second signal generator operating in synchronization with each other, wherein the plurality of unidirectional switches which connect the input phases and the output phases include first unidirectional switches which supply current from an input-phase side to an output-phase side, and second unidirectional switches which supply current from the output-phase side to the input-phase side, wherein first inductors of the plurality of inductors are provided between the input phases and the first unidirectional switches, and second inductors of the plurality of inductors are provided between the input phases and the second unidirectional switches, the second inductors having opposite polarity of induced current from the first inductors, and wherein the first inductors are magnetically coupled to one another and the output-phase side second inductors are magnetically coupled to one another.

18. A power converting apparatus comprising:

a power converter that includes a plurality of unidirectional switches which connect input phases and output phases, and that includes a plurality of switch groups each being provided for one of the input phases, and a plurality of inductors coupled to one another, each of the inductors being connected between one of the input phases and a corresponding one of the switch groups; and a controller that controls the power converter in response to a current command by controlling unidirectional switches of different phases among the plurality of unidirectional switches and controlling unidirectional switches of an identical phase among the plurality of unidirectional switches, wherein, in a case where unidirectional switches of the identical input phase among the plurality of unidirectional switches and unidirectional switches of the identical output phase among the plurality of unidirectional switches are simultaneously turned on, the controller selects an identical input phase and an identical output phase so that a voltage polarity of the input phase matches a voltage polarity of the output phase, wherein the plurality of unidirectional switches which connect the input phases and the output phases include first unidirectional switches which supply current from an input-phase side to an output-phase side, and second unidirectional switches which supply current from the output-phase side to the input-phase side, wherein first inductors are provided between the input phases and the first unidirectional switches, and second inductors are provided between the input phases and the second unidirectional switches, the second inductors having opposite polarity of induced current from the first inductors, and wherein the first inductors are magnetically coupled to one another and the second inductors are magnetically coupled to one another.

* * * * *